(12) United States Patent
Mayr

(10) Patent No.: US 9,206,946 B2
(45) Date of Patent: Dec. 8, 2015

(54) PRESSURE ACCUMULATOR

(71) Applicant: MAGNA STEYR Fahrzeugtechnik AG & Co KG, Graz (AT)

(72) Inventor: Franz Mayr, St. Marein bei Graz (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 13 days.

(21) Appl. No.: 13/860,077

(22) Filed: Apr. 10, 2013

(65) Prior Publication Data
US 2014/0130896 A1 May 15, 2014

(30) Foreign Application Priority Data
Apr. 11, 2012 (EP) .................................. 12163772

(51) Int. Cl.
*F17D 1/00* (2006.01)
*F17C 13/00* (2006.01)
*F17C 1/00* (2006.01)

(52) U.S. Cl.
CPC .................. *F17C 13/002* (2013.01); *F17C 1/00* (2013.01); *F17C 2201/0109* (2013.01); *F17C 2201/056* (2013.01); *F17C 2203/069* (2013.01); *F17C 2203/0617* (2013.01); *F17C 2205/0142* (2013.01); *F17C 2205/0146* (2013.01); *F17C 2205/0323* (2013.01); *F17C 2205/0394* (2013.01); *F17C 2205/0397* (2013.01); *F17C 2221/012* (2013.01); *F17C 2221/03* (2013.01);
(Continued)

(58) Field of Classification Search
CPC ...... F17C 13/002; F17C 1/00; F17C 2221/03; F17C 2223/0161; F17C 2223/036; F17C 2223/0153; F17C 2203/069; F17C 2223/0123; F17C 2201/056; F17C 2205/0142; F17C 2223/035; F17C 2205/0397; F17C 2205/0394; F17C 2205/0146; F17C 2201/0109; F17C 2205/0323; F17C 2221/012; F17C 2221/033; F17C 2203/0617; Y10T 137/4807; Y02E 60/321
USPC .......... 137/797, 266, 263, 265, 68.14; 285/321
See application file for complete search history.

(56) References Cited

U.S. PATENT DOCUMENTS 4,722,333 A    2/1988  Bartos
5,285,807 A *  2/1994  Nitzberg ..................... 137/68.14
(Continued)

FOREIGN PATENT DOCUMENTS

CN    1454304 A    11/2003
CN    1463343 A    12/2003
(Continued)

OTHER PUBLICATIONS

Korean Intellectual Property Office Notice of Preliminary Rejection for Korean Patent Application No. 10-2013-39267, mailed May 29, 2014, 2 pages, Korean Intellectual Property Office. (English translation included).

Primary Examiner — Marina Tietjen
Assistant Examiner — Umashankar Venkatesan
(74) Attorney, Agent, or Firm — Jordan IP Law, LLC; Todd A. Vaughn

(57) ABSTRACT

A pressurized storage tank arrangement having at least two pressurized storage tanks, the at least two pressurized storage tanks being configured for connection to one another in a fluid-conducting manner via a connecting device. The at least two pressurized storage tanks are configured for connection to the connecting device in a fluid-conducting manner at a first and a second connecting section.

17 Claims, 8 Drawing Sheets

(52) U.S. Cl.
CPC ..... *F17C 2221/033* (2013.01); *F17C 2221/035* (2013.01); *F17C 2223/0123* (2013.01); *F17C 2223/0153* (2013.01); *F17C 2223/0161* (2013.01); *F17C 2223/035* (2013.01); *F17C 2223/036* (2013.01); *F17C 2270/0168* (2013.01); *Y02E 60/321* (2013.01); *Y10T 137/4807* (2015.04)

(56) References Cited

U.S. PATENT DOCUMENTS

| | | | |
|---|---|---|---|
| 6,786,229 B1 * | 9/2004 | Friedlmeier et al. | 137/266 |
| 7,624,753 B2 * | 12/2009 | Suess et al. | 137/266 |
| 2002/0129867 A1 | 9/2002 | Krasnov | |
| 2003/0146214 A1 | 8/2003 | Idoguchi | |
| 2004/0159352 A1 | 8/2004 | Friedlmeier et al. | |
| 2006/0283519 A1 | 12/2006 | Campbell | |
| 2007/0261756 A1 | 11/2007 | Handa | |
| 2008/0196766 A1 * | 8/2008 | Gandy | 137/68.14 |
| 2009/0159258 A1 | 6/2009 | Handa | |
| 2010/0059138 A1 * | 3/2010 | Shi et al. | 141/5 |
| 2011/0088811 A1 * | 4/2011 | Shudo et al. | 141/248 |

FOREIGN PATENT DOCUMENTS

| | | |
|---|---|---|
| CN | 101025250 A | 8/2007 |
| CN | 101398128 A | 4/2009 |
| DE | 19812904 A1 | 11/1999 |
| DE | 10206502 A | 8/2003 |
| DE | 202006004434 U1 | 3/2006 |
| GB | 1072502 A | 6/1967 |
| JP | 2002-340208 A | 11/2002 |
| JP | 2003-262299 A | 9/2003 |
| JP | 2011-179519 A | 9/2011 |
| WO | 03006309 A1 | 1/2003 |

* cited by examiner

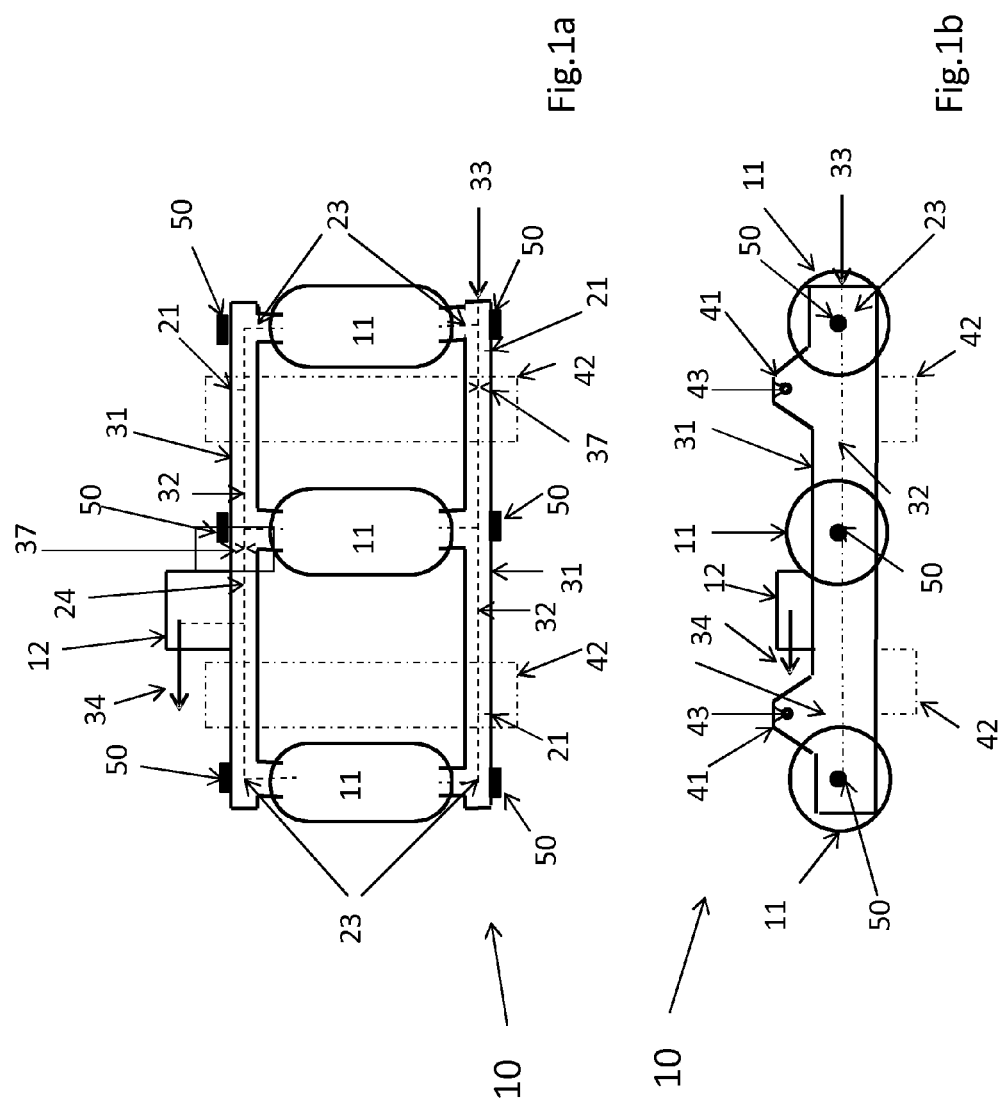

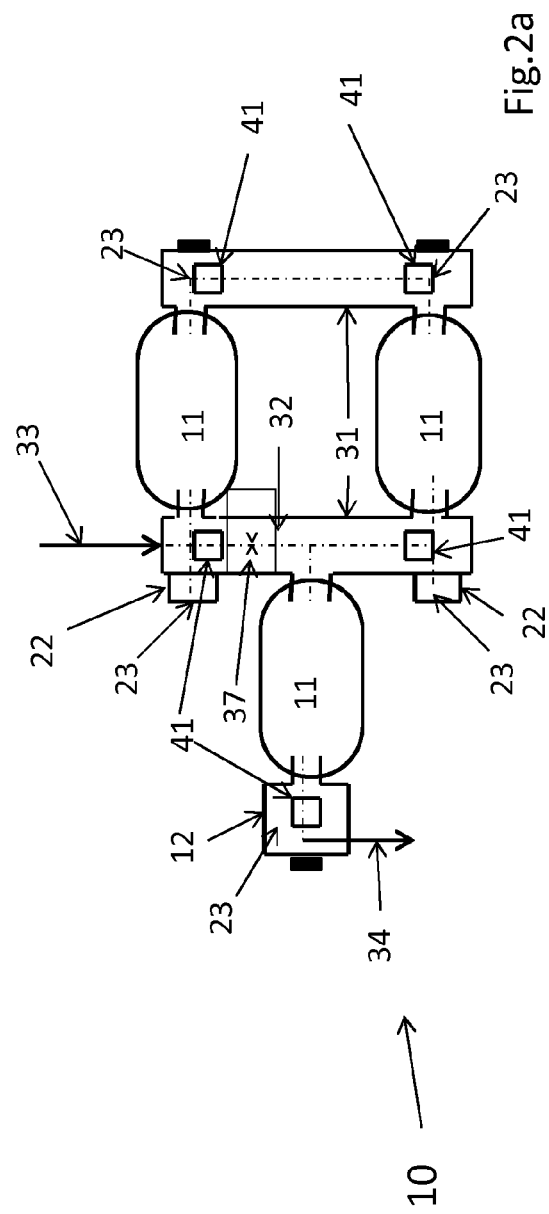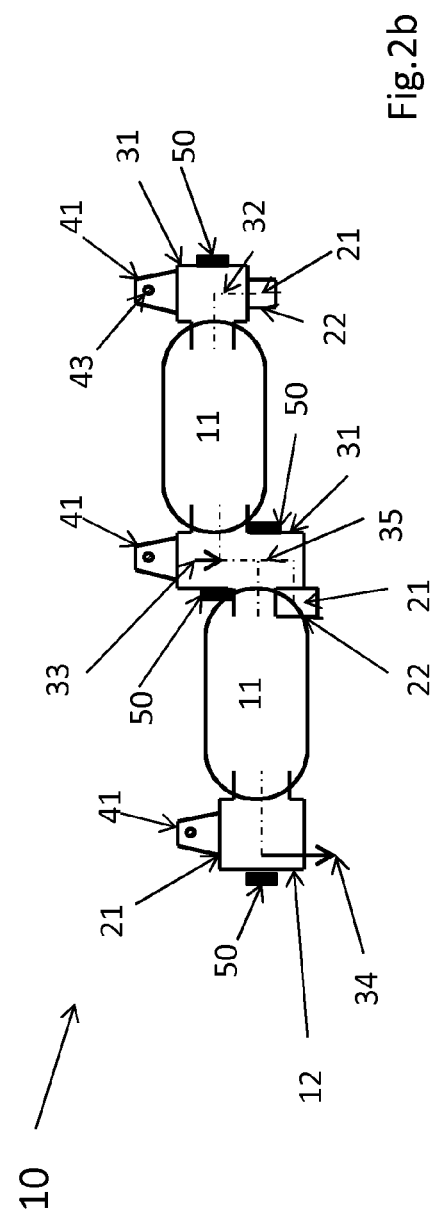

PRESSURE ACCUMULATOR

CROSS-REFERENCE TO RELATED APPLICATIONS

The present application claims priority under 35 U.S.C. §119 to European Patent Application No. EP 12163772.2 (filed on Apr. 11, 2012), which is hereby incorporated by reference in its entirety.

TECHNICAL FIELD

Embodiments are directed to a pressurized storage tank arrangement having at least two pressurized storage tanks, the at least two pressurized storage tanks configured for connection to one another in a fluid-conducting manner via a connecting device.

BACKGROUND

Pressurized storage tanks are used to hold pressurized fluids. In particular, pressurized storage tanks are used as fuel tanks for vehicles and then contain gases, e.g. CNG, mixed gases or hydrogen, or liquids such as LPG or LNG at high pressures. The pressurized storage tanks are usually produced as cylinders. Another known practice is to combine a plurality of pressurized storage tanks in a module. It is thereby possible to provide joint access to a plurality of pressurized storage tanks.

A fuel tank arrangement for storing pressurized gases for a motor vehicle having a plurality of individual fuel tanks, each with an end opening for the filling and emptying of the tank, which furthermore has a header and a holding part. The fuel tanks are configured for connection, on the one hand, to the header by way of their openings and, on the other hand, mechanically to the holding part. Hence, the individual fuel tanks bound together into a unit by the header and the holding part, is known from DE 20 2006 004 434 U1.

DE 102 06 502 C1 has furthermore disclosed a pressurized gas tank system having at least two gas containers of substantially the same kind, wherein the gas containers have a bottom part and a removal part and openings are associated with the removal parts. The removal parts are associated with a shutoff valve, and the removal parts protrude by way of the openings thereof into a connecting rail which connects the removal parts to one another. The openings are connected to a gas duct extending in the connecting rail, with the connecting rail being associated with a shutoff valve at a gas duct outlet and said valve forming the shutoff valve common to all the gas containers.

DE 198 12 904 A1 has disclosed a device for storing compressed gas, having a multiplicity of storage tanks, wherein each storage tank has a header and the respective headers are connected or may be connected to one another in a modular manner. The compressed gas is carried out of the storage tanks via a flow duct, which is provided in the headers and which communicates via a bore with the cavity of the respective storage tanks. The individual headers are connected by way of connecting elements, which are inserted into corresponding openings in the headers.

SUMMARY

Embodiments are directed to an enhanced pressurized storage tank arrangements of the type stated and, in particular, to provide a pressurized storage tank arrangement that has a very flexible structure and provides advantageous conditions for movement of fluid within the arrangement.

In accordance with embodiments, a pressurized storage tank arrangement having at least two pressurized storage tanks is provided, the at least two pressurized storage tanks configured for connection to one another in a fluid-conducting manner via a connecting device. The at least two pressurized storage tanks are configured for connection to the connecting device in a fluid-conducting manner at a first and a second connecting section.

In accordance with embodiments, the pressurized storage tanks are thus configured for connection to one another at at least two connection points, e.g., at opposite ends of cylindrical pressurized storage tanks via the connecting device. This advantageously allows a very wide variety of fluid flow configurations within the arrangement, in particular also circular flows, since it is possible for an inflow of fluid into a pressurized storage tank and an outflow within the pressurized storage tank arrangement to take place simultaneously. The pressurized storage tanks communicate via a separate second duct, e.g., during the filling thereof and during the removal of the fluid. Among other things, this advantageously also allows a simplified purging operation.

A purging operation is necessary, for example, if a test fluid which does not correspond to the medium stored during the actual use of the pressurized storage tanks is used during a final test on the leaktightness of the overall system, or if filling with, for example, hydrogen, for the transportation of the pressurized tank arrangement is dispensed with for reasons of safety. For hydrogen storage systems, helium or nitrogen are usually used as test fluids, but these may cause damage to the drive unit in use in the vehicle.

By virtue of the connecting arrangement in accordance with embodiments, the free communication between all the components and the possibility of elements that influence flow, such as reductions in cross section, it is advantageously possible to implement a purging operation which saves time, energy and resources during commissioning in the vehicle. This is achieved, for example, by introducing the fluid that is ultimately to be stored via a filling valve unit while the test fluid is being discharged or extracted by suction in a controlled manner at a removal valve unit. If purging has been carried out with a quantity corresponding to the total volume of the system, a high level of cleanliness in the system is achieved through the controlled flow through all the components. One major advantage is that this is achieved even with a very low pressure. Advantageously, no filling with test fluid under a high pressure, with time-consuming discharge and periodic repetition of the operation is thus required.

In accordance with embodiments, the first connecting sections of the pressurized storage tanks are configured for connection to a first connecting element of the connecting device and the second connecting sections of the pressurized storage tanks are configured for connection to a second connecting element of the connecting device. The first connecting element and the second connecting element being configured for connection to one another in a fluid-conducting manner exclusively via the pressurized storage tanks.

In accordance with embodiments, the connecting device is formed by two separate connecting elements, with one connecting element connecting the two first sections or ends of the pressurized storage tanks to one another, and the second connecting element connecting the two second sections or ends of the pressurized storage tanks to one another.

In accordance with embodiments, the connecting device is of mechanically stable design. If the connecting device is made up of connecting elements, as described hereinabove, the individual connecting elements are preferably embodied in a mechanically stable way. The connecting device or the connecting elements thus form a stable frame, which is used to accommodate pressurized storage tanks.

In accordance with embodiments, the connecting elements may form a mechanically stable frame together with pressurized storage tanks of elongate shape, e.g., cylindrical pressurized storage tanks, the two mutually opposite ends of the pressurized storage tanks being configured for connection in a fluid-conducting manner to the respective connecting elements.

In accordance with embodiments, fastening points for the fastening of the pressurized storage tank arrangement, in particular in a motor vehicle, are formed exclusively on the connecting device. The overall pressurized storage tank arrangement is accordingly installed by way of the connecting device. Flexible elements, such as rubber mounts, may be integrated at the fastening points, e.g., the suspension or mounting receptacles of the connecting device. By way of said elements, it is possible to accommodate changes in length and changes in the position of the pressurized storage tanks. In this arrangement, changes in the length of the pressurized storage tanks generally occur in a uniform manner owing to the simultaneous pressure build-up or reduction via the connecting sections and the connecting device, through the communicating ducts, thus reducing the flexibility required for this purpose.

In accordance with embodiments, valves and/or valve blocks and/or filters and/or shutoff elements and/or pressure reducers and/or reductions in cross section, in particular, a filling valve unit and/or a removal valve unit, are arranged in or on the connecting device. Components which serve to influence the fluid flow are thus advantageously arranged in the connecting device and may be distributed in a flexible manner throughout the connecting device.

In accordance with embodiments, the pressurized storage tanks are configured for connection inseparably to the connecting device. This results in making it only possible to separate a pressurized storage tank from the connecting device by destroying a seal and/or by way of a special tool. This makes it possible to check, even retrospectively, whether the end user has attempted to break the connection between a pressurized storage tank and the connecting device. This is intended to ensure that work on the connection is carried out only by trained personnel or specialist workshops.

In accordance with embodiments, the pressurized storage tanks are configured for connection to the connecting device mechanically by way of a fixed screwed joint, in particular, by way of a banjo bolt.

In accordance with embodiments, at least one pressurized storage tank and the connecting device may be configured for connection to one another in a fluid-conducting manner, the pressurized storage tank having a transverse bore on a first connecting section, the bore intersecting an axial bore of the pressurized storage tank, the transverse bore being configured for connection in a fluid-conducting manner to the connecting device. An axial bore is provided in a connecting section in the pressurized storage tank. The axial bore is intersected by a transverse bore. The transverse bore is preferably normal to the axial bore and is thus arranged parallel to the boundary wall of the pressurized storage tank in the connecting section. The transverse bore may therefore be configured for connection easily and reliably to bores of a connecting device that are likewise transverse to the pressurized storage tanks, in particular, may be configured for connection by way of a plug-in joint.

In accordance with embodiments, the term "bore" is intended to mean any elongate opening in a surrounding body. As a result, the production method for the opening is not defined. Apart from producing the opening by boring, other methods are therefore also included, e.g. the deformation of a profile.

Sealing rings for sealing between the pressurized storage tank and the connecting device are preferably installed on the first connecting section of the pressurized storage tank, on both sides of the transverse bore.

In accordance with embodiments, the first connecting section of the pressurized storage tank is configured for connection to the connecting device by way of a plug-in joint or clamp joint or snap joint. This advantageously makes possible rapid mounting and, depending on the embodiment, also rapid removal of the pressurized storage tank. One possibility for this purpose is, for example, to provide an accessible socket for a fitting and removal tool or a bore for removal.

The plug-in joint is preferably designed as a spring element, in particular, as a retaining ring, crescent-shaped retaining ring, bolt or screw, in the connecting section, said element coming to rest in a groove in the connecting device.

In accordance with embodiments, an axial clearance for movement for the plug-in joint, in particular, for the spring element, is formed, in particular a space for movement in a groove in the connecting device. A defined play in the groove is thereby allowed for the plug-in joint in the event of changes in the length of the pressurized storage tank.

The connecting device is preferably mounted in a vehicle and is used to support the pressurized storage tanks. The connecting device thus forms a stable frame, which is pre-installed in a vehicle. The individual pressurized storage tanks are inserted into this frame and may move in the frame in accordance with the predetermined range of movement.

In accordance with embodiments, the first connecting section of the pressurized storage tank is configured for connection to the connecting device by way of a screwed joint. For this purpose, use is made, in particular, of a screw, a screw nut and/or a cotter.

A pressurized storage tank component, in particular a valve, is preferably arranged in the axial bore of the pressurized storage tank.

In accordance with embodiments, the connecting device has an opening in the region of the axial bore of the pressurized storage tank. As a result, a pressurized storage tank component arranged in the axial bore, in particular, is easily accessible from the outside.

In accordance with embodiments, the opening may furthermore be covered by way of a cover, it being advantageously possible for the cover to be designed, in particular, as an indicator for the state of leaktightness of the pressurized storage tank. The cover prevents the ingress of dirt into the opening. Moreover, the cover may be embodied in such a way that non-destructive removal of the pressurized storage tank is not allowed and/or unauthorized access is evident. Moreover, the cover may be embodied in such a way that, if there is damage to the seal, the cover is arched outwards, for example, or tears, thus allowing the damage to the seal to be recognized in time.

In accordance with embodiments, the pressurized storage tank has a predetermined breaking point in the first connecting section, with a flow limiter also being arranged, in particular in the pressurized storage tank. The predetermined breaking point is arranged in such a way relative to the flow limiter that the flow limiter remains in the pressurized storage tank when there is a break at the predetermined breaking point.

In accordance with embodiments, the pressurized storage tank has a second connecting section, which is configured for connection in a fluid-conducting manner to the connecting device. The second connecting section is, in particular, of identical construction to the first connecting section. The pressurized storage tank may thus be configured for connection to the connecting device at two sections, in particular at both ends of a cylindrical pressurized storage tank, by way of a connection in accordance with embodiments.

DRAWINGS

Embodiments are described by way of example below with reference to the drawings.

FIG. 1a is a front view schematic illustration of a pressurized storage tank arrangement in accordance with embodiments.

FIG. 1b is a top view schematic illustration of a pressurized storage tank arrangement in accordance with embodiments.

FIG. 2a is a front view schematic illustration of a pressurized storage tank arrangement in accordance with embodiments.

FIG. 2b is a top view schematic illustration of a pressurized storage tank arrangement in accordance with embodiments.

DESCRIPTION

Figure 3:
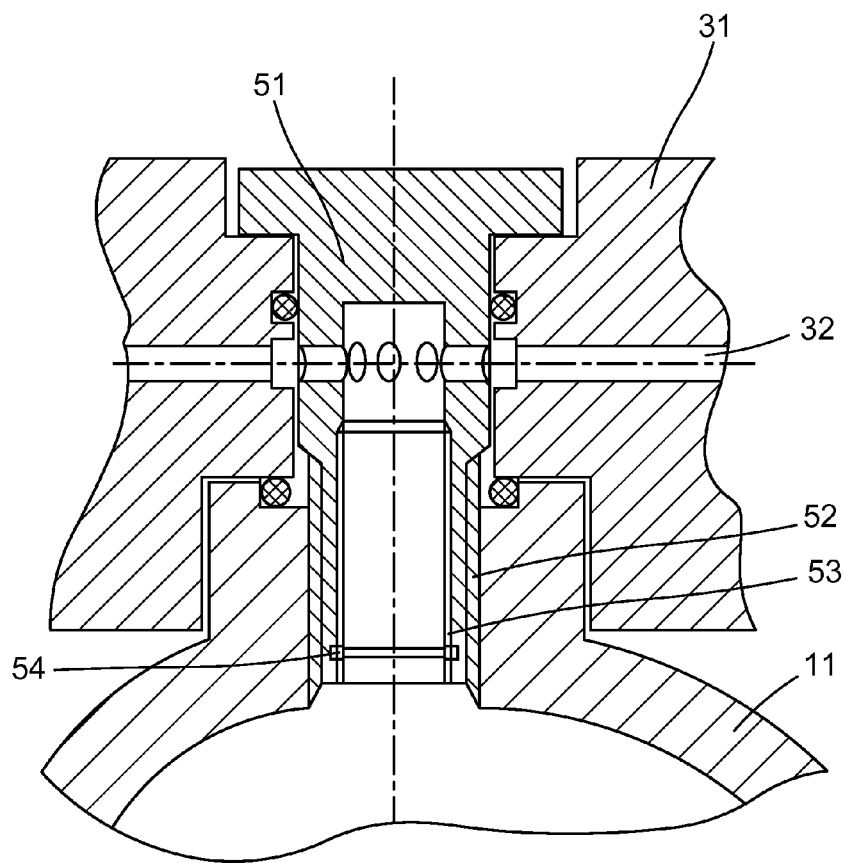
FIG. 3 to FIG. 7 are front view schematic illustrations of a connection between the pressurized storage tank and the connecting device in accordance with embodiments.

In FIGS. 1a to 2b, schematic illustrations of various pressurized storage tank arrangements in accordance with embodiments are illustrated.

The pressurized storage tank arrangement 10 includes cylindrical pressurized storage tanks 11, which are permanently connected at both ends thereof to connecting elements of a connecting device 31. The pressurized fluid flows out of the pressurized storage tanks 11 through bores 32 in the connecting elements. The connecting device 31 is of mechanically stable design and is connected at fastening points 41, 42 in such a way as to be suspended or to stand, e.g., in a vehicle. The pressurized storage tanks 11 are configured for connection to the connecting device 31 by way of screwed joints 50. A temperature-controlled pressure reducer 21, an automatic cylinder valve 23 and a maintenance valve 24 are integrated into or onto the connecting device 31, as are valve blocks 12, 22. Valves, valve blocks and the like may be mounted at any point in or on the connecting device 31.

Moreover, reductions in cross section 37 are arranged in the connecting device 31. Selective routing of the flow circulation in the overall system is possible through the arrangement of the cited components as desired in the connecting device and through the free communication between the pressurized storage tanks 11 via the connecting device 31. Through the arrangement as desired of the filling valve unit 33 and of the removal valve unit 34 in the pressurized storage tank arrangement 10, in particular, simple purging of the overall system during commissioning is thus made possible. A mechanically strong connection between the pressurized storage tanks 11 and the connecting device 31 is accomplished by way of a screwed joint 50, for example, and is illustrated in detail in FIG. 3.

FIG. 3 is a schematic illustration of a connection between pressurized storage tanks 11 and connecting device 31. For connection, use is made of a banjo bolt 51, which is secured on the pressurized storage tank 11 by way of an external thread 52. The internal thread 53 of the banjo bolt 51 is used to accommodate valves and/or filters that are close to the cylinder. Other types of fastening are also possible, however. Thus, the valves and/or filters close to the cylinder may be fixed using grooves 54 in the banjo bolt 51 by way of a retaining ring, for example.

FIGS. 4 to 7 are schematic illustrations of further embodiments of the connection between the pressurized storage tank and the connecting device from the front.

Figure 4:
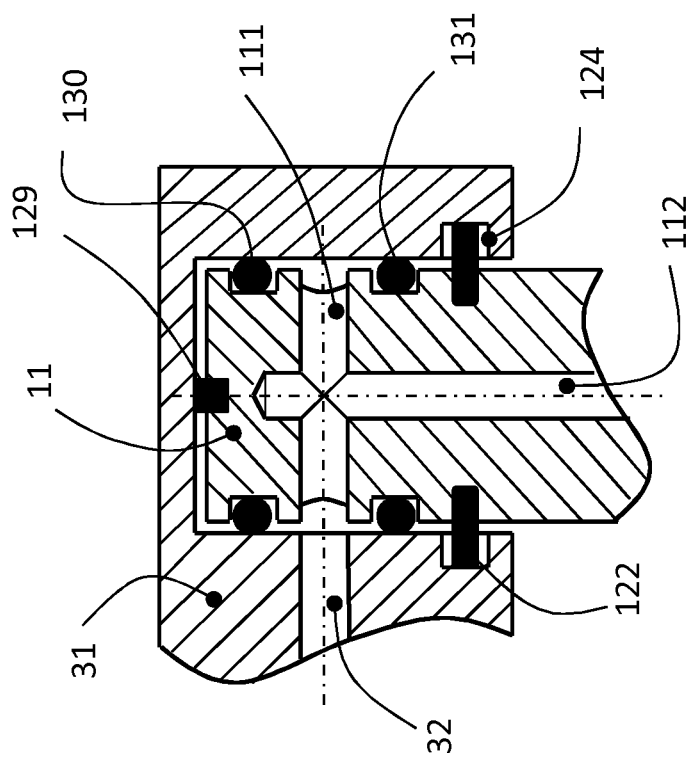

In FIG. 4, the connection between the pressurized storage tank 11 or a connecting section of the pressurized storage tank 11 and the connecting device 31 or a connection block of the connecting device 31 is embodied as a clamp joint or plug-in joint. Clamping is accomplished by way of a clamp connecting element 122, which is embodied as a crescent-shaped retaining ring and which is fixed in a groove in the connecting device 31. In this case, the groove has a clearance 124 in the axial direction for movement of the retaining ring.

In the connecting section of the pressurized storage tank 11, an axial bore 112 leads out of the interior of the pressurized storage tank 11 in the direction of an outer boundary of the connecting section of the pressurized storage tank 11. This axial bore 112 is intersected by a transverse bore 111, allowing a fluid flow to be carried onward from the axial bore 112 via the transverse bore 111. The transverse bore 111 extends as far as the end of the connecting section of the pressurized storage tank 11, and therefore, a connection between the interior of the pressurized storage tank 11 and the surroundings of the pressurized storage tank 11 is established via the transverse bore 111. Thus, fluid may thus pass into the pressurized storage tank 11 and may emerge from the storage tank 11 via the transverse bore 111. The transverse bore 111 is aligned in such a way that it opens into bore 32 in the connecting device. This alignment of the bores 111 and 32 relative to one another is facilitated particularly by the plug-in joint, in contrast especially to screwed joints.

Moreover, the radial alignment of the pressurized storage tank 11 may be secured by way of the centring feature 129, e.g. a centring pin. Sealing rings 130 and 131 are arranged on both sides of the transverse bore 111, between the connecting section of the pressurized storage tank 11 and the connection block of the connecting device 31.

Figure 5:
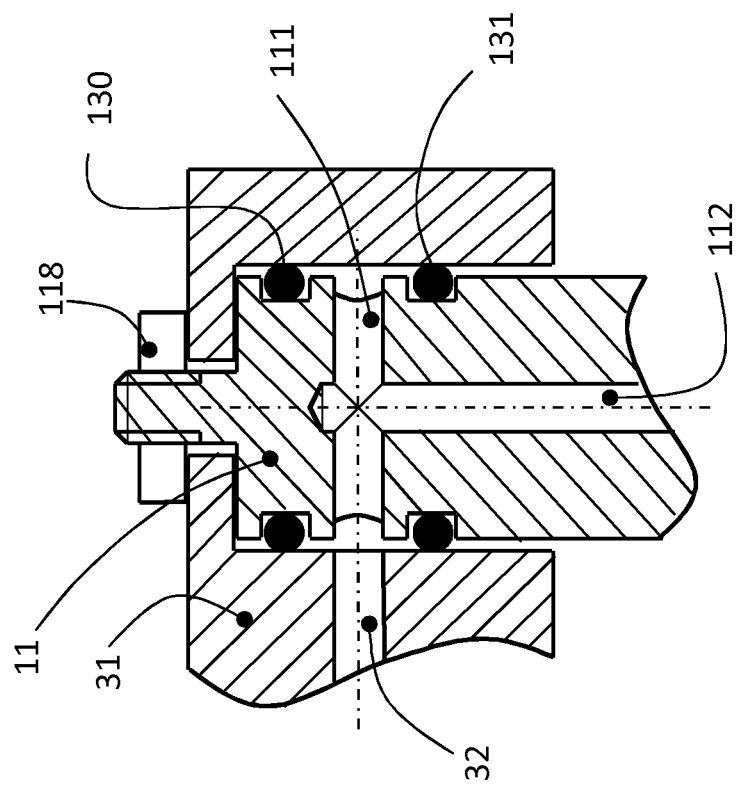

In the embodiment illustrated in FIG. 5, the connection between the pressurized storage tank 11 and the connecting device 31 is secured by way of a nut 118.

Figure 6:
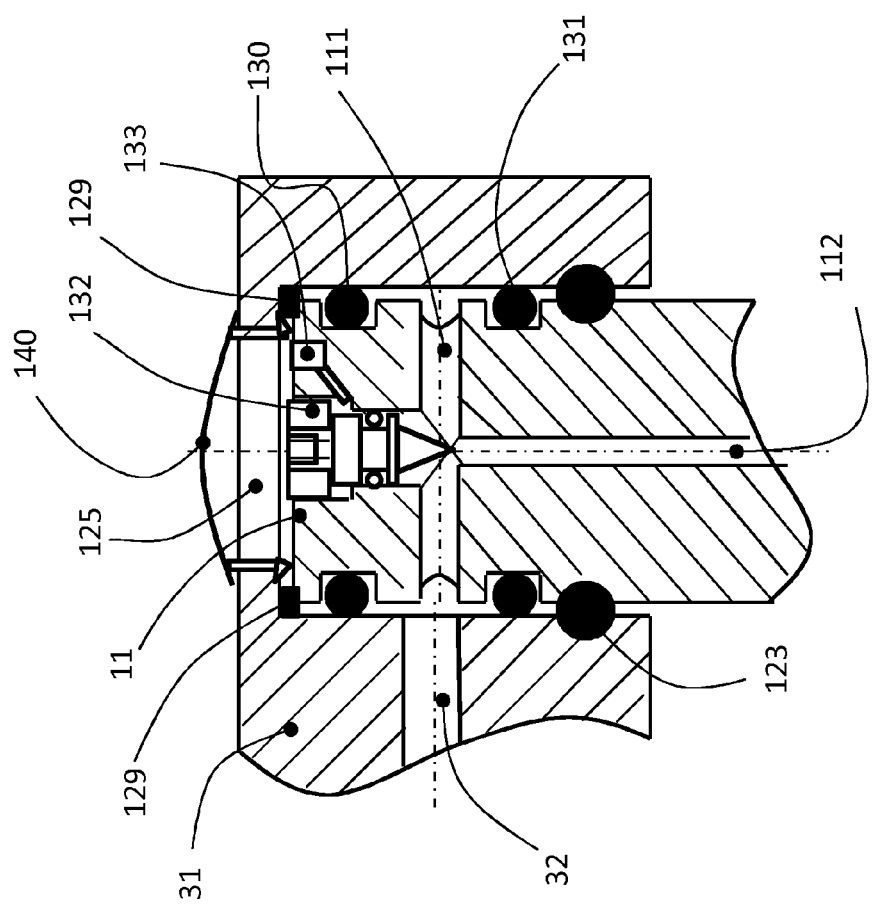

In the embodiment illustrated in FIG. 6, the connection between the pressurized storage tank 11 and the connecting device 31 is established by way of a screwed connecting element 123, but the connection could also be embodied as a plug-in joint. The connection likewise uses centring features 129. In this embodiment, the axial bore 112 is continuous, being embodied as a through opening.

Moreover, the connecting device 31 also has an opening 125 in the region of the open end of the axial bore 112, allowing components such as a manual valve, for example, to be screwed or plugged into the opening. In the opening of the axial bore 112 there is a screw 132, which, when positioned in the same plane as the pressurized storage tank 11, seals off the opening from the outside and exposes the bores 111, 112, or, when fully screwed in, seals off the axial bore 112 from the transverse bore 111. In a defined state of the screw 132, it exposes an additional opening 133 to the outside. The additional opening 133 is designed in such a way that a service line, for example, may be screwed in. The opening 125 may be covered by way of a cover 140 made of plastic or sheet metal, said cover being embodied in such a way that it is arched outwards or tears if there is damage to the seal, in particular to the sealing ring 130. The cover 140 is furthermore embodied in such a way that non-destructive removal is not possible and hence unauthorized access is prevented or is evident.

Figure 7:
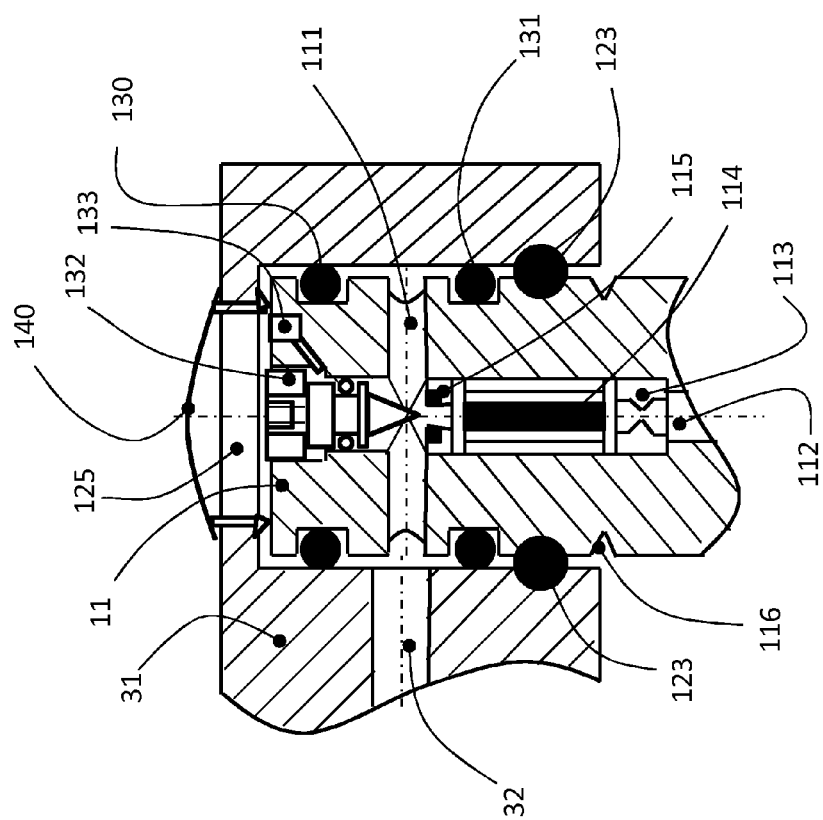

In the embodiment illustrated in FIG. 7, the connecting section of the pressurized storage tank 11 additionally has a predetermined breaking point 116 and a flow limiter 113, which are arranged in such a way that the flow limiter 113 remains in the pressurized storage tank 11 when there is a break at the predetermined breaking point 116. The axial bore 112 is embodied in such a way that a flow limiter 113 and/or a filter 114 and/or a sealing seat 115 may be screwed in or plugged in.

Figure 8:
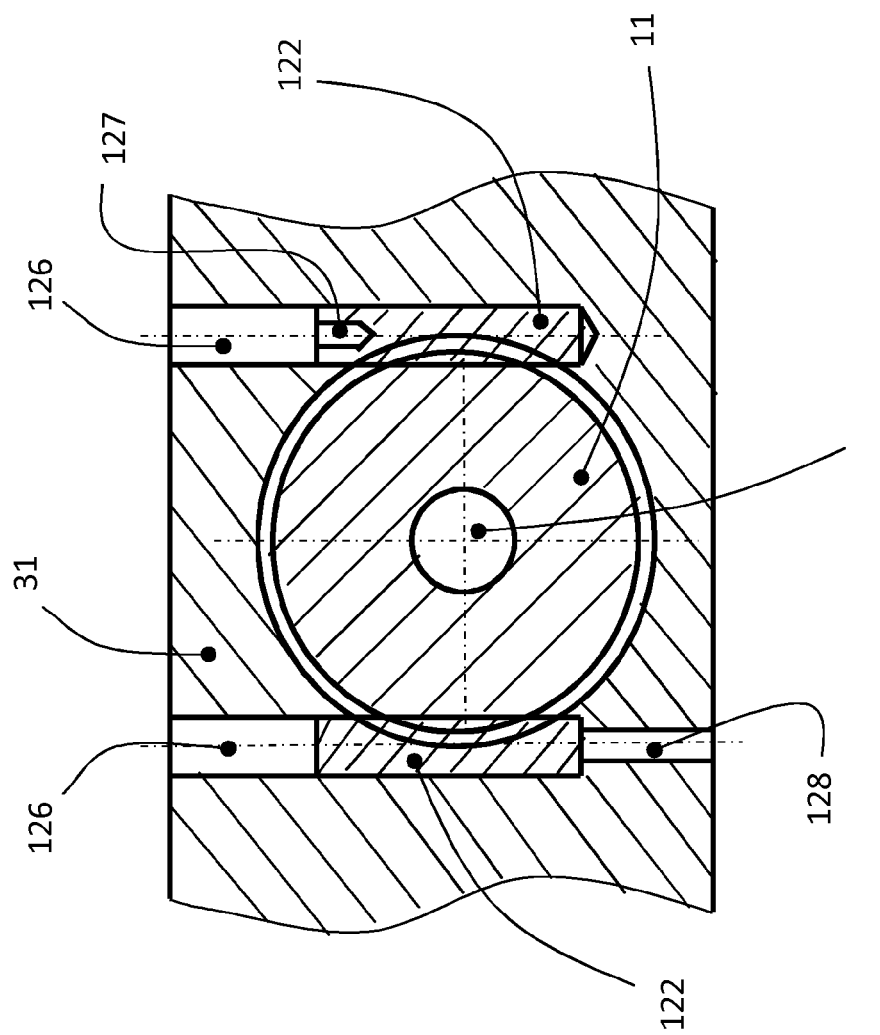
FIG. 8 is a top view schematic illustration of a connection between the pressurized storage tank and the connecting device in accordance with embodiments.

FIG. 8 illustrates a schematic illustration of a design of the connection between the pressurized storage tank and the connecting device from above. In this case, bolts are arranged as clamp connecting elements 122 in bores 126 which overlap with the groove in the pressurized storage tank 11. This embodiment is configured in such a way that rapid mounting and rapid removal are made possible by way of the accessible socket 127 for the fixing and removal tool and the bore 128.

Figure 9:
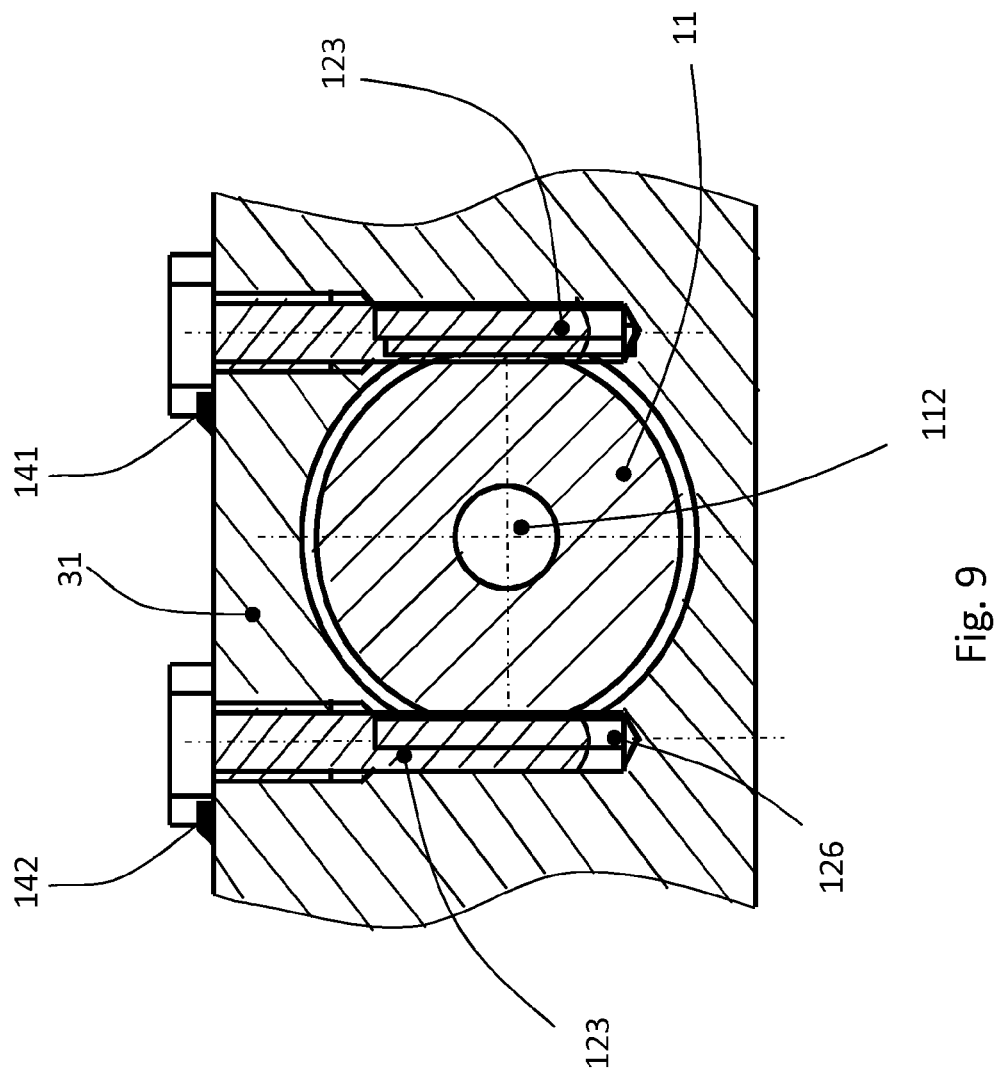
FIG. 9 is a top view schematic illustration of a connection between the pressurized storage tank and the connecting device in accordance with embodiments.

FIG. 9 illustrates a schematic illustration of another embodiment of the connection between the pressurized storage tank 11 and the connecting device 31 from above. In this case, screws are used as screwed connecting elements 123, the thread of said screws being formed along only part of the length of the screw. The front part of the connecting elements 123, which ensures that the pressurized storage tank 11 is retained on the connecting device 31, is embodied as an unthreaded stud. Given appropriate dimensioning of the groove, freedom of movement for the connecting element 123 is thereby ensured, and hence play is allowed for the pressurized storage tank 11 mounted in the connecting device 31. Seals 141, 142 are visible on the screwed connecting elements 123. These seals may be provided by way of paint or spot welds, for example.

Embodiments are directed to a pressurized storage tank arrangement that has a highly flexible structure and provides advantageous conditions for movement of fluid within the arrangement.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

LIST OF REFERENCE SIGNS 10 pressurized storage tank arrangement
11 pressurized storage tank
12 valve block
21 pressure reducer
22 valve block
23 cylinder valve
24 maintenance valve
31 connecting device
32 bore
33 filling valve unit
34 removal valve unit
37 reductions in cross section
41 fastening point, suspended embodiment
42 fastening point, standing embodiment
43 rubber mount
50 screwed joint
51 banjo bolt
52 external thread
53 internal thread
54 internal groove
111 transverse bore
112 axial bore
113 flow limiter
114 filter
115 sealing seat
116 predetermined breaking point
118 nut
122 clamp connecting element
123 screwed connecting element
124 clearance for movement
125 opening
126 bore
127 accessible socket
128 bore
129 centring feature
130 sealing ring
131 sealing ring
132 screw
133 opening
140 cover
141 seal
142 seal

What is claimed is:

1. A pressurized storage tank arrangement for a motor vehicle, comprising: at least two pressurized storage tanks, each having a first connecting section at a first end thereof, and a second connecting section at an opposite, second end thereof; and a connecting device connected at fastening points to the motor vehicle to form a mechanically stable frame together with the at least two pressurized storage tanks, and which includes a first connecting device section and a second connecting device section to respectively support and connect the at least two pressurized storage tanks respectively at the first connecting section and the second connecting section in a fluid-conducting manner wherein the pressure storage tank arrangement provides fuel for the motor vehicle.

2. The pressurized storage tank arrangement of claim 1, wherein:
    the first connecting element and the second connecting element are configured for connection to one another in a fluid-conducting manner exclusively via the pressurized storage tanks.

3. The pressurized storage tank arrangement of claim 1, further comprising a filling valve unit and/or a removal valve unit arranged in or on the connecting device.

4. The pressurized storage tank arrangement of claim 1, wherein the at least two pressurized storage tanks are configured for connection inseparably to the connecting device in a manner such that it is only possible to separate a respective one of the pressurized storage tanks from the connecting device by destroying a seal and/or mechanically.

5. The pressurized storage tank arrangement of claim 1, wherein the pressurized storage tanks are configured for connection to the connecting device by way of a fixed screwed joint.

6. The pressurized storage tank arrangement of claim 1, wherein:
at least one of the pressurized storage tanks has a transverse bore on the first connecting section;
the transverse bore intersects an axial bore of the pressurized storage tank; and
the transverse bore is configured for connection in a fluid-conducting manner to the connecting device.

7. The pressurized storage tank arrangement of claim 6, further comprising sealing rings configured to form a respective seal between the at least two pressurized storage tanks and the connecting device, wherein the sealing rings are installed on the first connecting section of the pressurized storage tank on both sides of the transverse bore.

8. The pressurized storage tank arrangement of claim 1, wherein the first connecting section of the pressurized storage tank is configured for connection to the connecting device by way of a joint.

9. The pressurized storage tank arrangement of claim 8, wherein the joint comprises a spring element in the connecting section, which comes to rest in a groove of the connecting device.

10. The pressurized storage tank arrangement of claim 1, further comprising a valve, arranged in an axial bore of the at least two pressurized storage tanks.

11. The pressurized storage tank arrangement of claim 1, wherein the connecting device has an opening in the region of an axial bore of the at least two pressurized storage tanks.

12. The pressurized storage tank arrangement of claim 1, wherein:
the pressurized storage tank has a predetermined breaking point in the first connecting section, with a flow limiter arranged in the pressurized storage tank; and
the predetermined breaking point is arranged in such a way relative to the flow limiter that the flow limiter remains in the pressurized storage tank when there is a break at the predetermined breaking point.

13. The pressurized storage tank arrangement of claim 5, further comprising sealing elements configured to form a seal at a region between the outer circumference of the fixed screwed joint and the connecting device and/or the at least two pressurized storage tanks.

14. The pressurized storage tank arrangement of claim 13, wherein the fixed screwed joint, has a transverse bore between sealing elements, which is configured for connection in a fluid-conducting manner to a bore of the connecting device.

15. The pressurized storage tank arrangement of claim 13, further comprising valves and/or filters and/or sensors arranged in the fixed screwed joint.

16. A pressurized storage tank arrangement for a motor vehicle, the pressure accumulator assembly comprising: a connecting device to be connected at fastening points to the motor vehicle and having a pair of spaced apart connecting elements each having a transversely extending bore; and at least one pressure accumulator supported at opposite ends thereof by a respective one of the connecting elements to thereby establish a fluid-conductive connection at both ends thereof between the transverse bore and an axial bore of the at least one pressure accumulator, wherein the connecting device and the at least one pressure accumulator together form a mechanically stable frame manner wherein the pressure storage tank arrangement provides fuel for the motor vehicle.

17. A pressurized storage tank arrangement for a motor vehicle, the pressure accumulator assembly comprising: a connecting device for connection at fastening points thereof to the motor vehicle, the connecting device having a pair of spaced apart connecting elements; and a plurality of pressure accumulators configured for fluidic connection to one another and the connecting elements at opposite ends thereof via the connecting elements of the connecting device, wherein the connecting device and the plurality of pressure accumulators together form a mechanically stable frame manner wherein the pressure storage tank arrangement provides fuel for the motor vehicle.

* * * * *